March 2, 1965  R. D. BLUM  3,171,471
MULTI-ROOM AIR CONDITIONING SYSTEMS
Filed Feb. 27, 1962
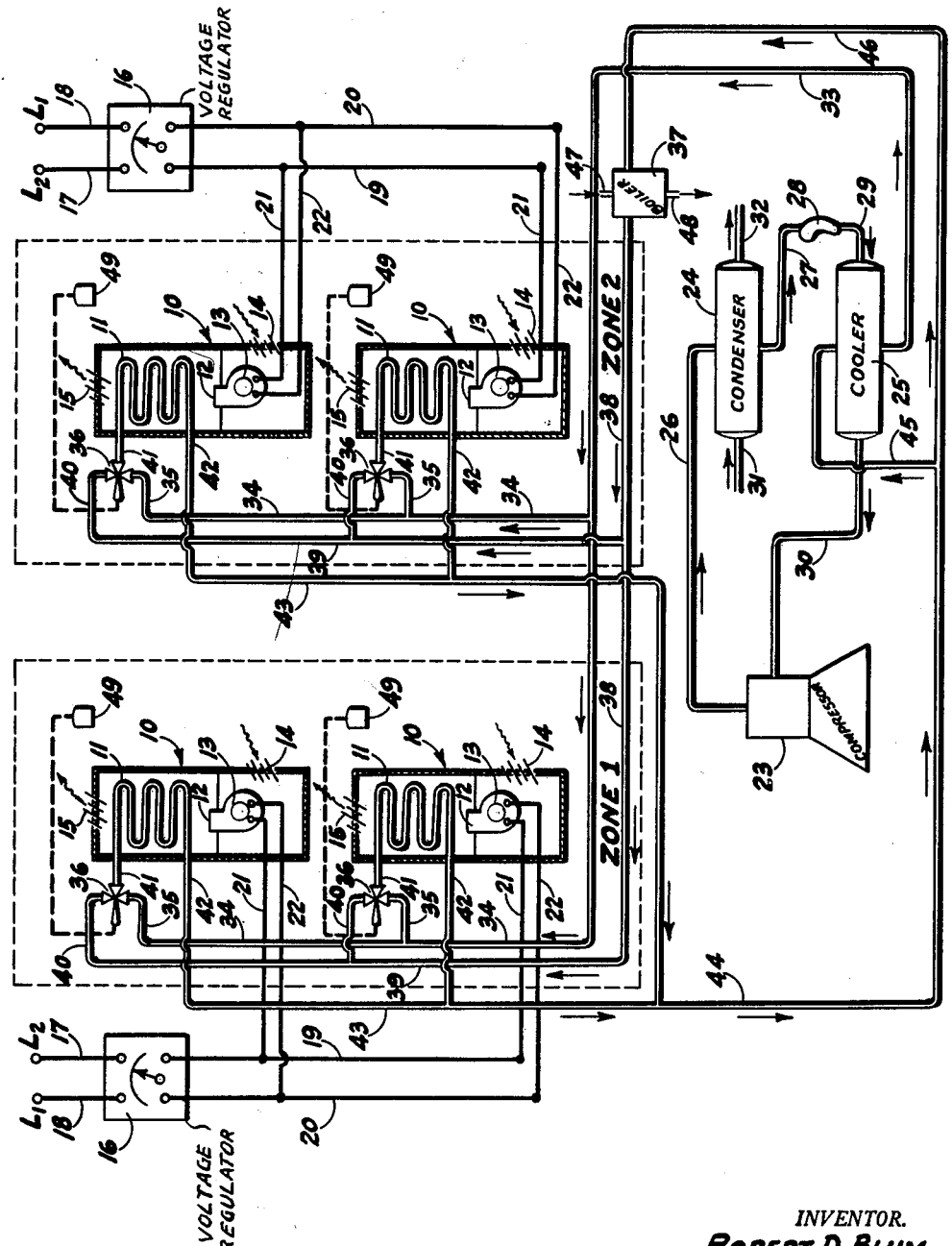
INVENTOR.
ROBERT D. BLUM.
BY
Sidney N. Rosenfeld
ATTORNEY United States Patent Office 3,171,471
Patented Mar. 2, 1965

3,171,471
MULTI-ROOM AIR CONDITIONING SYSTEMS
Robert D. Blum, Springettsbury Township, York County, Pa., assignor to Borg-Warner Corporation, Chicago, Ill., a corporation of Illinois
Filed Feb. 27, 1962, Ser. No. 176,042
12 Claims. (Cl. 165—2)

This invention relates to air conditioning systems for multi-room buildings and, more particularly, to that type of system wherein a "fan-coil" unit is utilized to provide heating or cooling to satisfy the various room requirements.

The invention is generally applicable to the so-called three-pipe systems, wherein a heated and a chilled liquid are concurrently supplied to a fan-coil unit for flow of either the chilled or heated liquid (or a mixture of the two) through the unit coil.

While the invention is more applicable to the three-pipe system, since such a system normally has valve means for controlling the liquid flow through the unit coil, it is, nevertheless, applicable to a two-pipe system, wherein either a heated or a chilled liquid is supplied to a fan-coil unit for flow therethrough. When utilized in a two-pipe system, which normally has no means for controlling the flow of liquid through the unit coil, then valve means must be added so that control of liquid flow may be had.

In a typical fan-coil system, the fan-coil units have a coil therein for the flow of a heat-exchange fluid therethrough, together with a motor driven fan, which serves to draw room air into the unit for flow over the coil in heat-exchange relation therewith. Generally, means are provided for permitting three fan speeds: high, medium, and low. Ideally, the room occupant then selects the particular speed which will give him the capacity he desires; more often, the speed selected is done on the basis of the noise level desired, the occupant accepting the resulting capacity. In such a fan-coil system, another disadvantage is that the low speed offered is generally considerably higher than is desirable, resulting in a higher capacity than needed with a consequent higher noise level. This is necessary because the fan motor must be able to start on low speed with 10% low line voltage supplied to the motor. This is so because oftentimes a system may be turned off over the weekend. At the time the system is turned off, various units may have been operating on low speed, and it is necessary that they begin operating when the system is turned on again.

A further disadvantage of the above type system is that considerable time and expense is expended in the design and development of the fan motor for every different size unit. It will be apparent that, if a single speed motor could be substituted for the normal three-speed motor or single speed motor with a choke coil to give the three speeds desirable, a considerable reduction in first cost could be had.

It is to the obviation of the above-enumerated disadvantages and defects that the present invention is directed.

In carrying out the invention, a fan-coil system is provided, including a plurality of fan-coil units, each unit being located in air communication with the particular space or room to be conditioned. The units are provided with infinitely variable speed motors, which motors are not under the control of the room occupant. The motors of the various units are tied together in an electrical circuit, preferably by zones. Means, such as a voltage regulator, are then centrally provided for simultaneously adjusting the speed of all the fans of any particular zone. In the normal three-pipe system, a three-way liquid sequencing valve is provided for the admission of either heated or chilled liquid to the unit coil, and this valve can then be thermostatically adjusted by the room occupant to maintain the desired room temperature under the fan speed prevailing. In a two-pipe system, some such valve needs to be provided for room occupant capacity control.

The system has the advantage of: (1) lower noise level throughout the year, since the units can then operate at as low a speed as desirable; (2) the fan speed may be selected to fit the particular outdoor requirements, higher during the day and lower at night, and the occupant of the particular room need not be concerned with selecting the proper fan speed; (3) lower first cost; (4) less time and cost required for design and development of new units; and (5) generally lower operating costs, since the unit fans always run at the optimum speed.

It is an object of the invention, therefore, to provide a fan-coil air conditioning system at a lower first cost, the system being more adaptable to varying conditions, and capable of operating at a lower fan speed than normally is possible. A further object of the invention is to provide a fan-coil air conditioning system for multi-room buildings, wherein a plurality of fan-coil units are provided, at least one said unit being provided in air communication with each room or space wherein conditioning is desired. The units all have a motor for operating the unit fan, and are characterized by all the motors being electrically connected together in a closed circuit and wherein control means are provided for varying the speeds of all the unit fans simultaneously. Another object is to provide a system of the type just above mentioned, wherein the speed of all the motors is infinitely variable in response to changes in the voltage supplied thereto.

The invention consists of the novel constructions, arrangements and devices to be hereinafter described and claimed for carrying out the above-stated objects and such other objects as will appear from the following description of a preferred embodiment of the invention described with reference to the accompanying drawing, in which:

The figure is a schematic representation of an air conditioning system according to the invention.

The invention is shown as applied to a typical three-pipe system but, as was pointed out above, it is well adapted for use with a two-pipe system. There are only two zones shown, but it will be appreciated that as many zones may be provided as may be necessary to satisfactorily condition the particular building involved. There is shown only two units in each zone. However, it will be readily apparent that this is only representative of the actual invention, and the number of units will vary according to the particular circumstances.

Each zone is provided with a number of fan-coil units 10 (only two being shown), each unit including a heat-exchange coil 11 and a fan 12, driven by a variable speed electric motor 13. Fan 12 draws room air into the unit 10 through an air inlet 14 and discharges it back into the room by way of an air outlet 15. The air, in its passage from inlet 14 to outlet 15, passes in heat-exchange relation with coil 11, giving up heat to the coil or picking up heat therefrom, dependent on whether chilled or heated liquid is flowing through the coil at the time. A voltage regulator 16 is provided for each zone, with all the fan motors in the various zone units electrically connected in a closed circuit to the voltage regulator 16. A pair of leads 17 and 18 lead from any suitable source of electricity to each voltage regulator 16. From each voltage regulator 16, a pair of leads 19 and 20 are provided, across which various lines 21 and 22 from electric motors 13 are connected to complete the electrical circuit.

Means are provided for simultaneously supplying a heated and a chilled heat-exchange liquid to unit coils 11.

As shown, this takes the form of a typical refrigerating system for supplying chilled liquid, and a steam boiler for supplying the heated liquid. It will be apparent that many different methods may be provided for supplying the heated and chilled liquid with the herein-disclosed method being only one embodiment.

The refrigerating system takes the form of a compressor 23, a water cooled condenser 24, and a cooler 25. A hot gas line 26 interconnects the discharge of compressor 23 with the inlet to condenser 24. A hot liquid line 27 leads from the outlet of condenser 24 to a high pressure float 28. A cold liquid line 29 leads from high pressure float 28 to the inlet of cooler 25. From the outlet of cooler 25 a cold gas line 30 leads back to the suction of compressor 23 to complete the refrigerant circuit. An entering water line 31 and a leaving water line 32 are provided in condenser 24 for the purpose of leading a suitable coolant therethrough.

The chilled liquid circuit takes the form of a chilled liquid header 33 leading from cooler 25. Chilled liquid risers 34 are connected to header 33. Lines 35 lead from risers 34 to the chilled liquid side of three-way sequencing valves 36.

The heated liquid circuit takes the form of a boiler 37 having a heated liquid header 38 leading therefrom. Heated liquid risers 39 are connected to liquid header 38. Lines 40 lead from risers 39 to the heated liquid side of three-way sequencing valves 36. The third or common side of each three-way valve 36 is connected to the coils 11 by way of a line 41. From each heat-exchange coil 11, a line 42 is connected to one of the return lines 43, which, in turn, are connected to a return header 44. From return header 44, a branch line 45 leads to cooler 25 to complete the chilled liquid circuit, while a second branch line 46 leads to boiler 37 to complete the heated liquid circuit.

Boiler 37 is provided with steam inlet line 47 and a steam outlet line 48 for suitably heating the heat-exchange liquid flowing thereover. It will be apparent that any suitable heating medium may be utilized.

Control of the temperature within an individual room may be had by way of thermostats 49, which control three-way sequencing valves 36 to admit either heated or chilled liquid, dependent on the temperature within the room that is desired.

*Operation*

In operation, compressor 23 delivers hot refrigerant gas to the condenser 24, wherein the heat of the gas is removed by water flowing through lines 31 and 32. The condensed refrigerant then flows through line 27 to high pressure float 28. In its passage through high pressure float 28, the pressure and corresponding temperature is reduced for flow to cooler 25. Heat-exchange liquid flowing to cooler 25 through line 45 has its temperature reduced by being in heat-exchange with the cold refrigerant within the cooler. It then flows through header 33, risers 34, and lines 35 to three-way sequencing valves 36 for flow through the individual unit coils 11, should thermostats 49 call for cooling. Liquid flowing from return header 44 into branch line 46 is heated in its passage through boiler 37 by the steam flowing through lines 47 and 48. The heated liquid then flows through header 38, risers 39, and connecting lines 40 to the heated liquid side of three-way valves 36 for flow through the individual unit coils 11, should thermostats 49 call for heating. The heated or chilled liquid flowing through unit coils 11 exits therefrom by way of lines 42 into return lines 43, and thence into return header 44 for eventual flow part through branch line 45 to the cooler 25 and part through branch line 46 to the boiler 37 to complete the heat-exchange liquid circuit.

Voltage regulators 16 are adjusted, either automatically or manually and preferably by zones, to control the speed of motors 13 driving fans 12 in the various units 10. By controlling the fan speeds centrally, they may be adjusted to properly deliver the volume of air required to suit outside conditions. In addition, they may be run at a far lower speed and consequent noise level than is possible with individually controlled fans. For night time use, they would ordinarily be set down to a very low level to provide necessary room comfort and, at the same time, to maintain noise level at a minimum. It is also readily apparent that, during the heating season, they would be run at a minimum level because of the greater differential between the temperature of the heated liquid and the room air. Voltage regulators 16 will be so adjusted or set that a minimum voltage is always maintained to provide a minimum motor and fan speed.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. In an air conditioning system for a multi-room building comprising a plurality of air conditioning units located in air communication with rooms to be conditioned, said air-conditioning units being arranged in a plurality of groups located in different zones, each said unit comprising a heat-exchange coil and a fan for flowing room air over said coil in heat-exchange relation therewith; and means for supplying heat-exchange fluid to said coils; the improvement comprising a plurality of electric motors for said fans, all of said motors within a particular zone being electrically connected in a closed circuit, and means associated with each of said zones for simultaneously varying the speed of all of said motors within a particular zone in the same manner.

2. In the system as set out in claim 1, valve means controlling the admission of said heat-exchange fluid to said coils; and means for heating or cooling said fluid.

3. In an air conditioning system for a multi-room building comprising a plurality of air conditioning units located in air communication with rooms to be conditioned, said air-conditioning units being arranged in a plurality of groups located in different zones, each said unit comprising a heat-exchange coil and a fan for flowing room air over said coil in heat-exchange relation therewith, valve means associated with each of said heat exchange coils, means for concurrently supplying a heated heat-exchange fluid and a cooled heat-exchange fluid to said valve means, said valve means controlling the admission of said heated and cooled fluid to said coils; the improvement comprising a plurality of electric motors for said fans, all of said motors within a particular zone being electrically connected in a closed circuit, and means associated with each said zone for centrally varying the speed of all of said motors in the same manner within a particular zone, whereby occupant room temperature control is maintained solely by control of said valve means.

4. An air conditioning system for a multi-room building comprising a plurality of air conditioning units located in air communication with rooms to be conditioned, said air-conditioning units being arranged in a plurality of groups located in different zones, each said unit comprising a heat-exchange coil and a fan for flowing room air over said coil in heat-exchange relation therewith, means for supplying heat-exchange fluid to said coils, valve means controlling the admission of said heat-exchange fluid to said coils, a plurality of electric motors for all of said fans, said motors within a particular zone being electrically connected in a closed circuit, and means associated with each of said zones for simultaneously varying the speed of said motors within a particular zone in the same manner.

5. The air conditioning system as set out in claim 4, and means for either heating or cooling the heat-exchange fluid.

6. The air conditioning system as set out in claim 4, said means for supplying heat-exchange fluid comprising two circuits, means for heating the fluid in one circuit and for cooling the fluid in the other circuit, and a common return line for receiving said heated and said cooled fluid from said coils.

7. An air conditioning system for a multi-room building comprising a plurality of air conditioning units, said units being located in rooms to be conditioned, said air-conditioning units being arranged in a plurality of groups located in different zones, each said unit comprising a heat-exchange coil and a fan for flowing room air over said coil in heat-exchange relation therewith, means for supplying a heat-exchange fluid to said coils, an electric motor for each said fan, all of said motors within a particular zone being electrically connected in a closed circuit, and means associated with each of said zones for simultaneously varying the speed of said motors within a particular zone in the same manner.

8. An air conditioning system for a multi-room building comprising a plurality of air conditioning units located in rooms to be conditioned, said air-conditioning units being arranged in a plurality of groups located in different zones, each said unit comprising a heat-exchange coil and a fan for flowing room air over said coil in heat-exchange relation therewith, means for supplying heat-exchange fluid to said coils, a plurality of electric motors for said fans, all of said motors within a particular zone being electrically connected in a closed circuit, and means associated with each of said zones for varying the voltage of current supplied to all of said motors within a particular zone to thereby simultaneously vary the speed thereof in the same manner.

9. In an air conditioning system for a multi-room building comprising a plurality of air conditioning units located in air communication with rooms to be conditioned, said air-conditioning units being arranged in a plurality of groups located in different zones, each said unit comprising a heat-exchange coil, a fan for flowing room air over said coil and a motor for operating said fan; and means for supplying a heat-exchange fluid to said coils; the method of controlling room temperature comprising the steps of controlling, in the same manner, the speed of all of said motors within a particular zone centrally for initial room temperature control, and controlling the admission of heat-exchange fluid to said unit heat-exchange coils for final room temperature control.

10. In an air conditioning system for a multi-room building comprising a plurality of air conditioning units located in air communication with rooms to be conditioned, said air-conditioning units being arranged in a plurality of groups located in different zones, each said unit comprising a heat-exchange coil, a fan for flowing room air over said coil and a motor for operating said fan; and means for supplying a heat-exchange fluid to said coils; the method of controlling room temperature and noise levels comprising the steps of controlling, in the same manner, the speed of all of said motors within a particular zone centrally in accordance with desired noise level and temperature conditions, and controlling the admission of heat-exchange fluid to said unit heat-exchange coils for final room temperature control.

11. A method of air conditioning a multi-room building comprising the steps of providing a plurality of air conditioning units in air communication with rooms to be conditioned, said air-conditioning units being arranged in a plurality of groups located in different zones, said units each comprising a heat-exchange coil, a fan for flowing room air over said coil, and a motor for operating said fan; supplying a heat-exchange fluid to said coils; controlling, in the same manner, the speed of all of said fans within a particular zone centrally in accordance with predetermined general conditions; and controlling the admission of heat-exchange fluid to said coils in accordance with individual room temperature conditions.

12. A method of air conditioning a multi-room building comprising the steps of providing a plurality of air conditioning units in air communication with rooms to be conditioned, said air-conditioning units being arranged in a plurality of groups located in different zones, said units each comprising a heat-exchange coil, a fan for flowing room air over said coil, and a motor for operating said fan; supplying a heat-exchange fluid to said coils; controlling, in the same manner, the speed of all of said fans within a particular zone centrally in accordance with predetermined desired room noise levels, and controlling the admission of heat-exchange fluid to said coils in accordance with individual room temperature conditions.

References Cited in the file of this patent
UNITED STATES PATENTS

| | | |
|---|---|---|
| 2,140,787 | Cornell | Dec. 20, 1938 |
| 2,282,210 | Plum | May 5, 1942 |
| 2,458,560 | Buchanan | Jan. 11, 1949 |
| 2,797,068 | McFarlan | June 25, 1957 |